July 26, 1960

R. F. HAUSER 2,946,254

BLACKBOARD FOR INSTRUCTION IN MUSIC

Filed Sept. 7, 1955

INVENTOR.
Robert F. Hauser.
BY
Michael S. Striker
Attorney

United States Patent Office 2,946,254
Patented July 26, 1960

2,946,254
BLACKBOARD FOR INSTRUCTION IN MUSIC
Robert F. Hauser, Fulachstrasse 34, Schaffhausen, Switzerland
Filed Sept. 7, 1955, Ser. No. 532,957
10 Claims. (Cl. 84—471)

The present invention relates to a blackboard provided with staff lines to facilitate instruction in music.

For this particular purpose blackboards provided with staff lines have been used in the past. The note symbols or successions thereof (melodies) to be explained to a student were written by hand on the blackboard while the corresponding sound or melodies had to be produced independently by means of some musical instrument.

It is evident that this is inconvenient for the instructor and causes loss of time in the instruction procedure.

It is therefore a main object of the invention to provide for a device of the type set forth which would eliminate the drawbacks of known devices and greatly facilitate musical instruction.

With above object in view, the blackboard according to the invention is characterized by a substantially flat panel having a surface adapted to receive marks representing musical notes and having staff lines marked on it; along and between these lines there are conductive rails placed in parallel, each rail being electrically connected in an electrical circuit serving to generate the desired sounds; a wand forming part of said circuit is provided for pointing at the sites of the written notes on the panel, whereby the circuit portion corresponding to a particular rail at which the wand is pointed is completed. By pointing at a written note, the sound of the note pointed at becomes audible simultaneously, and a further instrument for producing the note pointed at becomes superfluous. It is essential for the instruction in reading music that the tone be heard at the same time as, and for as long a time as, the note is being pointed at.

Figure 1:
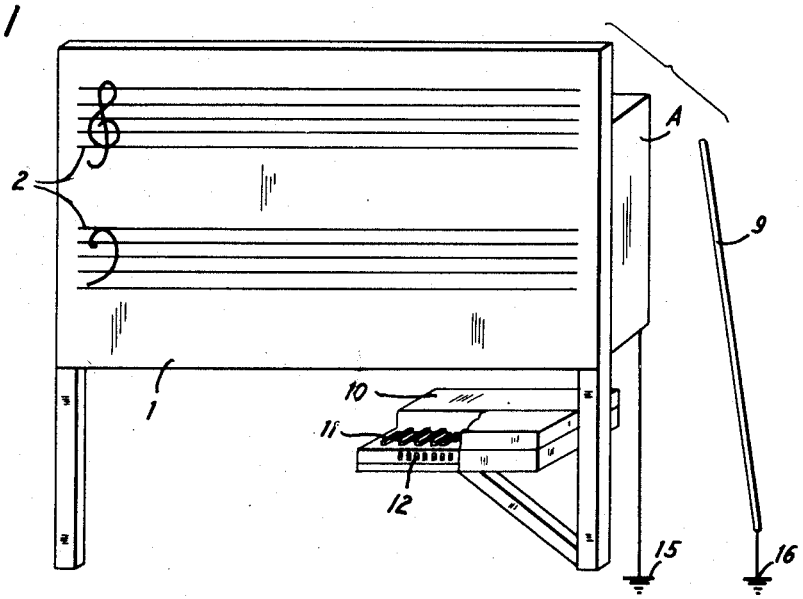
Figure 2:
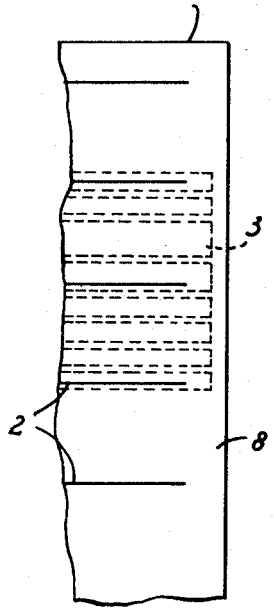
Figure 3:
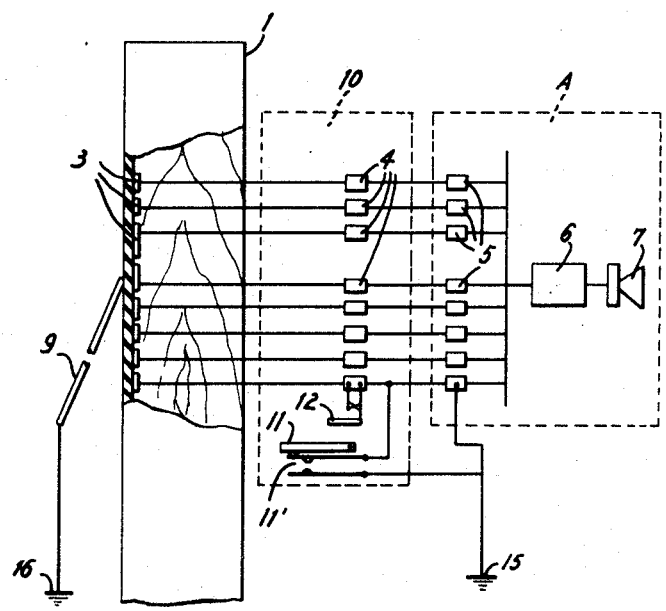

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a view of a blackboard with attached auxiliary control device and with a wand for pointing;

Figs. 2 and 3 respectively show details on a larger scale in front view and partially in cross-section.

Marked on the front surface of a blackboard or panel 1 are the staff lines 2 with the corresponding clefs. Parallel to the staff lines the panel has for each tone a rail 3 of conducting material embedded therein and forming part of a tuned circuit grounded at 15, each rail being conductively connected in this circuit via a control element 4 to an audio-frequency generator 5 for obtaining the corresponding tone at the corresponding pitch. From the generators the sound oscillations are carried to the loud-speaker 7 via common amplifier 6. This arrangement is shown surrounded by dotted line A. Arranged over the rails 3 on the blackboard is an insulating smooth layer 8 on which the notes can be marked with chalk. The notes can be pointed at with the wand 9, constituting a triggering means whereby a tone will be caused to be produced by said generator 5. The tone must thereby be audible as long as the note is pointed at.

The pointing wand 9 may be grounded at 16 or be electrically connected to the circuit means associated with the panel. Triggering the tone may take place capacitively, inductively or magnetically.

The accessory device 10 mounted on the panel 1 includes a keyboard or manual 11, the single keys thereof comprising switches 11' in circuit with the corresponding audio-frequency generators 5. In order to be able to sound notes exclusively by pointing wand 9 at certain note marks belonging to definite keys (or modes), the switching device 12 mounted on the accessory device 10 allows of cutting out any notes, singly or in groups, by operating the controls 4 as shown by way of example in Fig. 3 for one of the circuits. But the tones may be produced at any time by depressing the appropriate key 11.

As generators and depending on the timbre of pitch to be produced, so-called R—C, L—C or saw-tooth oscillators of conventional design may be employed.

The playing manual fitted with keys 11 permits the audio-frequency generators 5 to be operated so that either, with blackboard and wand the tone may be produced, or a tone may be produced in the same or different qualities by means of the manual keys 11, which additively makes possible to use the keys 11 for an accompaniment of the sounds caused by use of the wand 9. The switching means 12 mounted below the manual and operating the controls 4, by which single tones corresponding to notes marked on the blackboard may be cut out, serves among other things to facilitate pointing out the notes marked on the blackboard.

What I claim is:

1. A device for audibly producing a plurality of visually represented musical notes, comprising, in combination, a substantially flat panel member having at least one surface adapted to receive marks representing musical notes and having marked on said surface at least one musical staff composed of a set of staff lines; a set of tuned circuit means each including audio-frequency generator means for producing a sound corresponding to one of the musical notes, each of said circuit means being responsive to changes in the respective impedance thereof; a set of electro-conductive rails insulated from each other and each respectively connected into one of said circuit means and mounted on said panel extending along said staff lines and respectively associated therewith and with the spaces between said lines; and manually operated freely movable triggering means structurally separate from said panel and adapted to be brought selectively into proximity with any of said marks made on or between said staff lines on said surface of said panel and thereby with the electro-conductive rail associated with the respective staff line or space therebetween, for changing the impedance of the respective circuit depending upon the position of said triggering means relative to the rail forming part of the particular circuit, whereby when said triggering means is pointed at a musical note marked on said musical staff said sound-producing means causes audible production of the corresponding musical note.

2. A device as set forth in claim 1 wherein each said circuit means is responsive to changes in the capacitance thereof and wherein said triggering means is operative to change said capacitance thereof.

3. A device as set forth in claim 1 wherein each said circuit means is responsive to changes in the magnetic flux thereof and wherein said triggering means is operative to change said magnetic flux thereof.

4. A device as set forth in claim 1 wherein each said circuit means is responsive to changes in the inductance thereof and wherein said triggering means is operative to change said inductance thereof.

5. A device as set forth in claim 1, wherein said manually operated movable triggering means is a wand adapted to change the impedance of the respective circuit.

6. A device as set forth in claim 5 and including means for grounding said wand.

7. A device as set forth in claim 6 which includes keyboard switch means including a set of depressible keys respectively associated with said circuit means and with a musical note, said keyboard switch means being connected to said circuit means and adapted to operate any one of said circuit means during depression of the respectively associated key and independently of said triggering means to produce a sound corresponding to the respective musical note, whereby an accompaniment may be additively played while said wand operates circuits associated with other musical notes.

8. A device as set forth in claim 7 which includes auxiliary switching means respectively associated with said circuit means and said electro-conductive rails for disconnecting selected electro-conductive rails from the respective circuit means to render said disconnected circuit means non-responsive to triggering by said triggering means.

9. A device for audibly producing a plurality of visually represented musical notes, comprising, in combination, a substantially flat panel member having at least one surface adapted to receive marks representing musical notes and having marked on said surface at least one musical staff composed of a set of staff lines; a set of tuned circuit means each including an audio frequency generator for producing a sound corresponding to one of the musical notes, and each of said circuit means being responsive to changes in the respective impedance thereof; a common amplifier and loudspeaker combination connected to all said audio frequency generators for being supplied by any of them singly or jointly; a set of electro-conductive rails insulated from each other and each respectively connected into one of said circuit means and mounted on said panel extending along one of said staff lines and respectively associated therewith and with the spaces between said lines; and manually operated freely movable triggering means structurally separate from said panel and adapted to be brought selectively into proximity with any one of said marks on or between said staff lines on said surface of said panel and thereby with the electro-conductive rail associated with the respective staff line or spaced therebetween, for changing the impedance of the respective circuit depending upon the position of said triggering means relative to the rail forming part of the particular circuit, whereby when said triggering means is pointed at a musical note marked on said musical staff said audio-frequency generator means causes audible production of the corresponding musical note.

10. A device for audibly producing a plurality of visually represented musical notes, comprising, in combination, a plurality of circuit means each responsive to variation of the respective impedance thereof to produce an audible musical note respectively associated therewith; a substantially flat panel member having represented on a surface thereof at least one musical staff and adapted to have visually represented on said surface a plurality of musical notes in different positions relative to said staff respectively corresponding to said plurality of audible musical notes; a plurality of electro-conductive rails insulated from each other and mounted on said panel extending along said panel member, each of said electro-conductive rails being respectively associated with said note positions relative to said musical staff and being connected with the respective circuit means producing the corresponding audible musical note; and a freely movable wand adapted to be brought into proximity with any of said electro-conductive rails for varying the impedance of the respective circuit means so that the respective circuit means is actuated to produce an audible note while said wand is pointing at a visual representation of said note in the corresponding position on the musical staff.

References Cited in the file of this patent

UNITED STATES PATENTS

| | | |
|---|---|---|
| 1,661,058 | Theremin | Feb. 28, 1928 |
| 2,254,284 | Hanert | Sept. 2, 1941 |

FOREIGN PATENTS

| | | |
|---|---|---|
| 451,421 | Great Britain | Aug. 5, 1936 |
| 907,499 | Germany | Mar. 25, 1954 |